Dec. 3, 1940.     H. HORNSCHUCH     2,223,519
PACKING DEVICE
Filed May 13, 1939
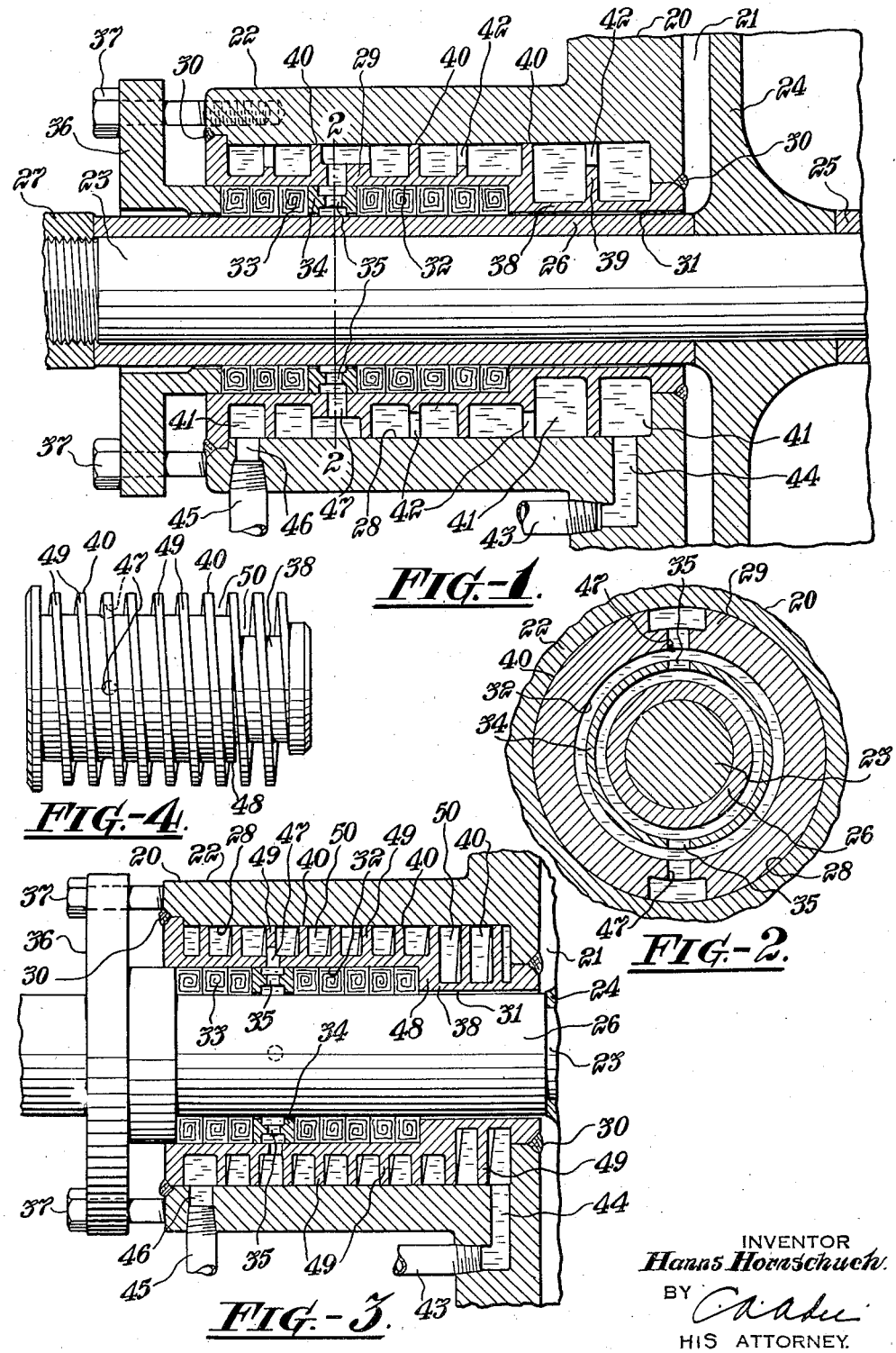
INVENTOR
*Hanns Hornschuch*
BY
HIS ATTORNEY.

Patented Dec. 3, 1940

2,223,519

UNITED STATES PATENT OFFICE 2,223,519

PACKING DEVICE

Hanns Hornschuch, Easton, Pa., assignor to Ingersoll-Rand Company, Jersey City, N. J., a corporation of New Jersey Application May 13, 1939, Serial No. 273,419

1 Claim. (Cl. 286—27)

This invention relates to packing devices, and more particularly to packing devices for pumps handling fluid of high temperature.

One object of the invention is to prevent the exposure of the packing material to the heat of the fluid being pumped.

Another object is to assure the continued pliancy of packing of the compressible type throughout a long period of service.

Other objects will be in part obvious and in part pointed out hereinafter.

In the drawing accompanying this specification and in which similar reference numerals refer to similar parts, Figure 1 is a longitudinal elevation, partly in section, of a packing device constructed in accordance with the practice of the invention and the stuffing box of a pump to which the packing device is applied, Figure 2 is a transverse view taken on the line 2—2 of Figure 1, Figure 3 is a view similar to Figure 1 showing a modified form of the invention, and Figure 4 is a longitudinal side view of a detail.

Referring more particularly to the drawing and at first to the form of the invention illustrated in Figures 1 and 2, 20 designates a portion of a pump casing having a pumping chamber 21 and a stuffing box 22 adjacent the pump chamber.

A shaft 23 extends through the stuffing box and the pump chamber and carries an impeller 24 which is held in position on the shaft by a pair of sleeves 25 and 26. The latter sleeve extends through the stuffing box and is pressed against the impeller 24 by a nut 27 threaded on the shaft 23.

The sleeve 26 serves as a renewable wearing surface for the shaft in the plane of the stuffing box 22 and, in accordance with the practice of the invention, the stuffing box is provided with a bore 28 of considerably larger diameter than the sleeve to receive a container 29 which may be secured to the stuffing box in any suitable manner, as for example by welding material 30. The bore in the stuffing box is of two diameters comprising a reduced portion 31 adjacent the inner end of the sleeve 26, which it encircles, and an enlarged portion 32 to receive packing rings 33 of the compressible type.

The bore 32 extends from the bore 31 to the outermost end of the container 29 and intermediate the ends of the group of packing rings is a lantern gland 34 having channels 35 for the passage of fluid serving to effect a seal around the sleeve 26. A gland 36 extends into the outer end of the bore 32 for compressing the packing rings 33 and is actuated by bolts 37 extending through the gland 36 and threaded into the stuffing box 22.

The wall 38 of the container 29 adjacent the sleeve 26 and the packing rings 33 is preferably relatively thin to assure a rapid transmission of heat, and on the outer surface of the wall 38 are annular ribs 39 which seat with their peripheries 40 against the surface of the bore 28 in the stuffing box. The ribs 39 are spaced suitable distances apart to define channels 41 therebetween for cooling medium and are continued beyond the inner end of the bore 32 and so arranged that portions of the innermost channels 41 lie in the longitudinal plane of the enlarged bore 32 in order to maintain a body of cooling liquid between the inner end of the packing and the source of heat. In the outer zones of the ribs are ports 42 to afford communication between adjacent channels 41.

The ports 42 in adjacent ribs are preferably staggered with respect to each other, that is, the port 42 of one rib lies on one side of the axis of the container and the port 42 in the adjacent rib lies on the opposite side. Owing to this arrangement the cooling medium flowing through the channels 41 will follow a serpentine path around the sleeve 26 and the packing rings 33 to assure the intimate contact of cooling medium with the periphery of the container 29 and also with the ribs carried by the container.

As a preferred arrangement the cooling medium, as for example water, is first introduced into the innermost channel 41 by a supply conduit 43 which opens into a channel 44 in the stuffing box leading to said innermost channel 41. An outlet is provided for the cooling medium by a conduit 45 attached to the stuffing box and communicating with the outermost channel 41 through a port 46.

The cooling medium circulated through the channels 41 also serves to fill the channels 35 in the lantern gland and the wall 38 is accordingly provided with ports 47 to afford communication between the channels 35 and the immediately adjacent channel 41.

In the form of the invention illustrated in Figures 3 and 4 the container, designated 48, is provided on its outer surface with a spiral rib 49 that extends from the outer end of the container to a point beyond the inner end of the bore 32. The rib 49 seats with its periphery against the wall of the bore 28 wherewith it cooperates to provide a spiral channel 50 for conveying cooling medium from the supply conduit 43 around the shaft 23 and the packing rings 33 to the discharge conduit 45. Portions of the innermost spirals, and thus of the channel 50, in this instance also lie in the longitudinal plane of the bore 32 in order to minimize the flow of heat to the inner end of the packing. The container is also provided with ports 47 to convey liquid from the spiral channel 50 into the channels 35 in the lantern gland 34.

In practice, the present invention has been found to be highly effective for use in connection with compressible packing in stuffing boxes of pumps handling hot liquids. By circulating cooling medium through the stuffing box in the manner described the temperature in the vicinity of the packing material may be maintained at a sufficiently moderate degree to assure the initial pliancy of the packing through a greatly extended period of service. The packing will, therefore, be prevented from early assuming a set form and from becoming baked to a degree of hardness that will mar the surface of the rotary element which it is intended to seal.

I claim:

A packing device for a rod, comprising a stuffing box surrounding the rod, a container in the stuffing box having annular ribs on its periphery cooperating with the stuffing box to define channels for cooling medium, said ribs having ports to afford communication between adjacent channels and the ports in adjacent ribs being located on the opposite sides of the container, and packing in the container for the rod.

HANNS HORNSCHUCH.